United States Patent [19]

Haworth et al.

[11] 4,277,123
[45] Jul. 7, 1981

[54] RACEWAY STRUCTURE FOR POWER PANEL

[75] Inventors: Richard G. Haworth, Holland; Harold R. Wilson, Holland Township, Ottawa County; Ditmar K. Tillmann, Holland, all of Mich.

[73] Assignee: Haworth Mfg., Inc., Holland, Mich.

[21] Appl. No.: 64,931

[22] Filed: Aug. 8, 1979

[51] Int. Cl.³ ............................................. H02G 3/22
[52] U.S. Cl. .................................. 339/22 R; 174/48; 174/66; 339/44 R
[58] Field of Search ...................... 339/22 R, 23, 21 R, 339/43, 44 R, 44 M; 174/48, 49, 65 R, 65 G, 101, 66; 52/220, 221, 239, 242

[56] References Cited

U.S. PATENT DOCUMENTS

| | | | |
|---|---|---|---|
| 1,718,252 | 6/1929 | Putnam | 52/220 |
| 2,532,427 | 12/1950 | Smith | 174/65 R |
| 4,135,775 | 1/1979 | Driscoll | 339/22 R |
| 4,203,639 | 5/1980 | Vanden Hoek et al. | 339/22 R |

OTHER PUBLICATIONS

IBM Tech. Discl. Bulletin, Stillwagon, vol. 16, No. 7, p. 2227, 12-1973.
Westinghouse ASD Publication, Power and Communications Distribution System, 6-1978.
Power Plus, Series 9000 Structural Panels, Steelcase Inc., 6-1978.

Primary Examiner—Neil Abrams
Attorney, Agent, or Firm—Blanchard, Flynn, Thiel, Boutell & Tanis

[57] ABSTRACT

A raceway structure for association with a wall panel so as to enclose and confine power and communication cables which extend longitudinally along the wall panel and longitudinally throughout several series-connected such panels. The raceway structure utilizes a pair of side covers which removably attach to the wall panel and cooperate to define a raceway for enclosing therein electrical terminals and communication cables. The raceway structure has access openings for providing convenient access to the electrical terminals, such as by permitting an electrical receptacle, power feed, or communication cable to be positioned therein or passed therethrough. The side cover has a closure integrally hinged thereto for closing the access opening when use of same is not desired, with the closure being swingable into an open position within the raceway while remaining integrally attached to the cover when use of the opening is desired, whereby different openings can be selectively utilized when desired and then closed again when use of the opening is not desired.

19 Claims, 14 Drawing Figures

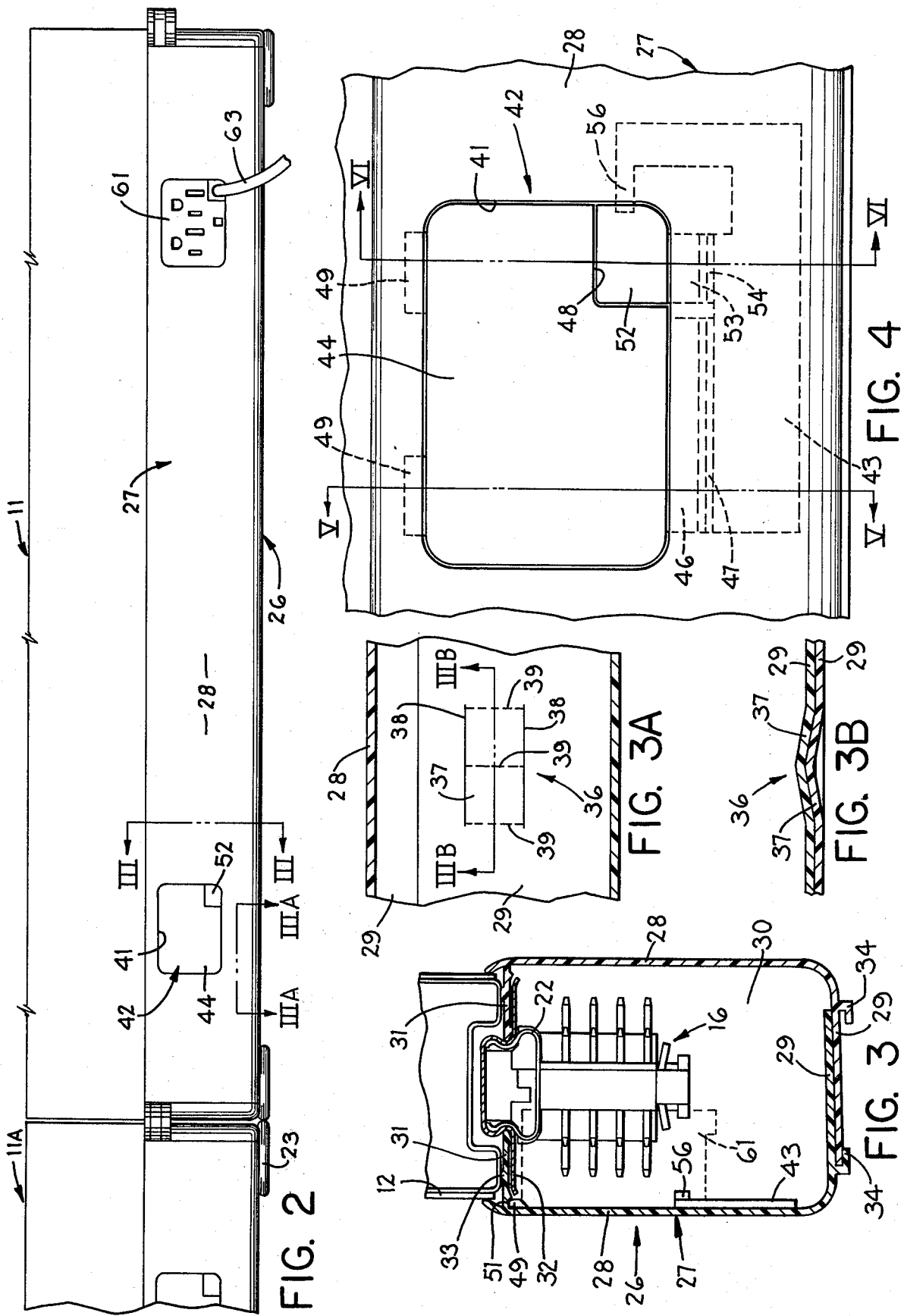

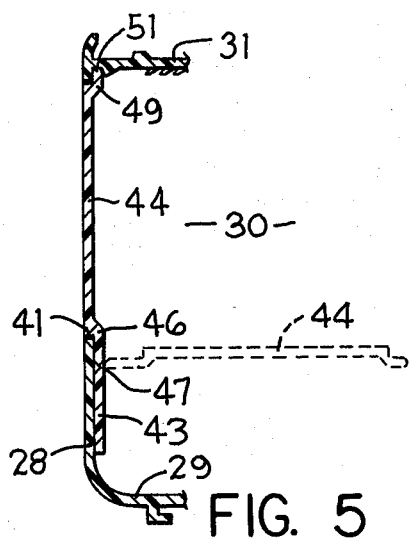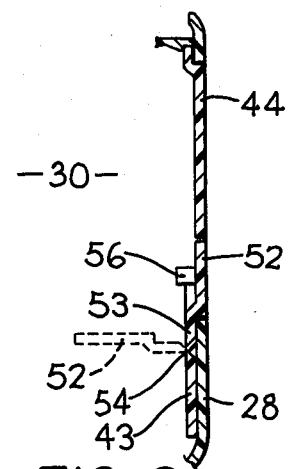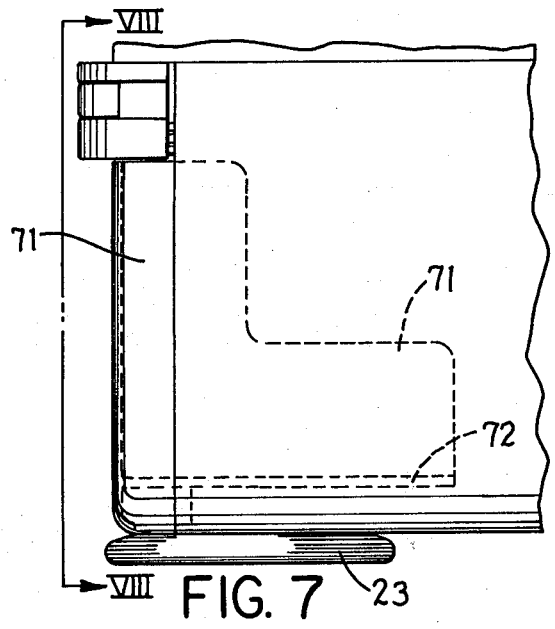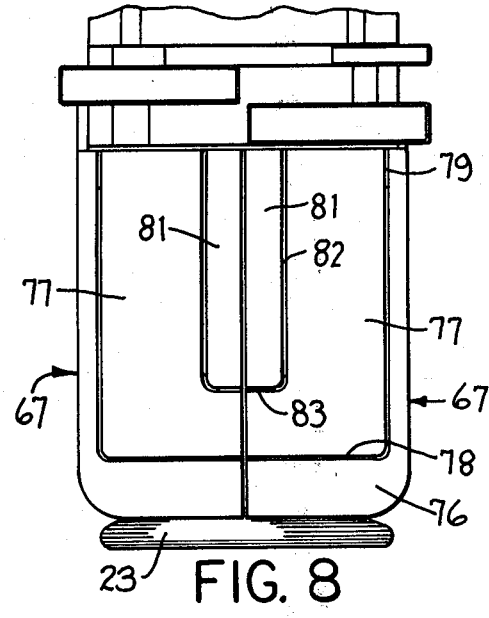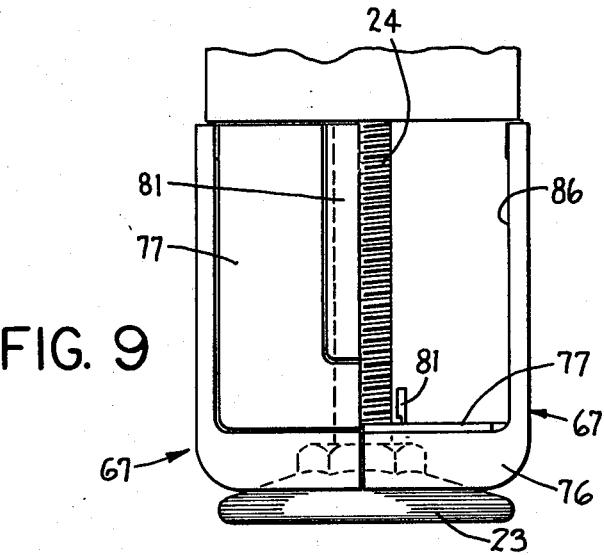

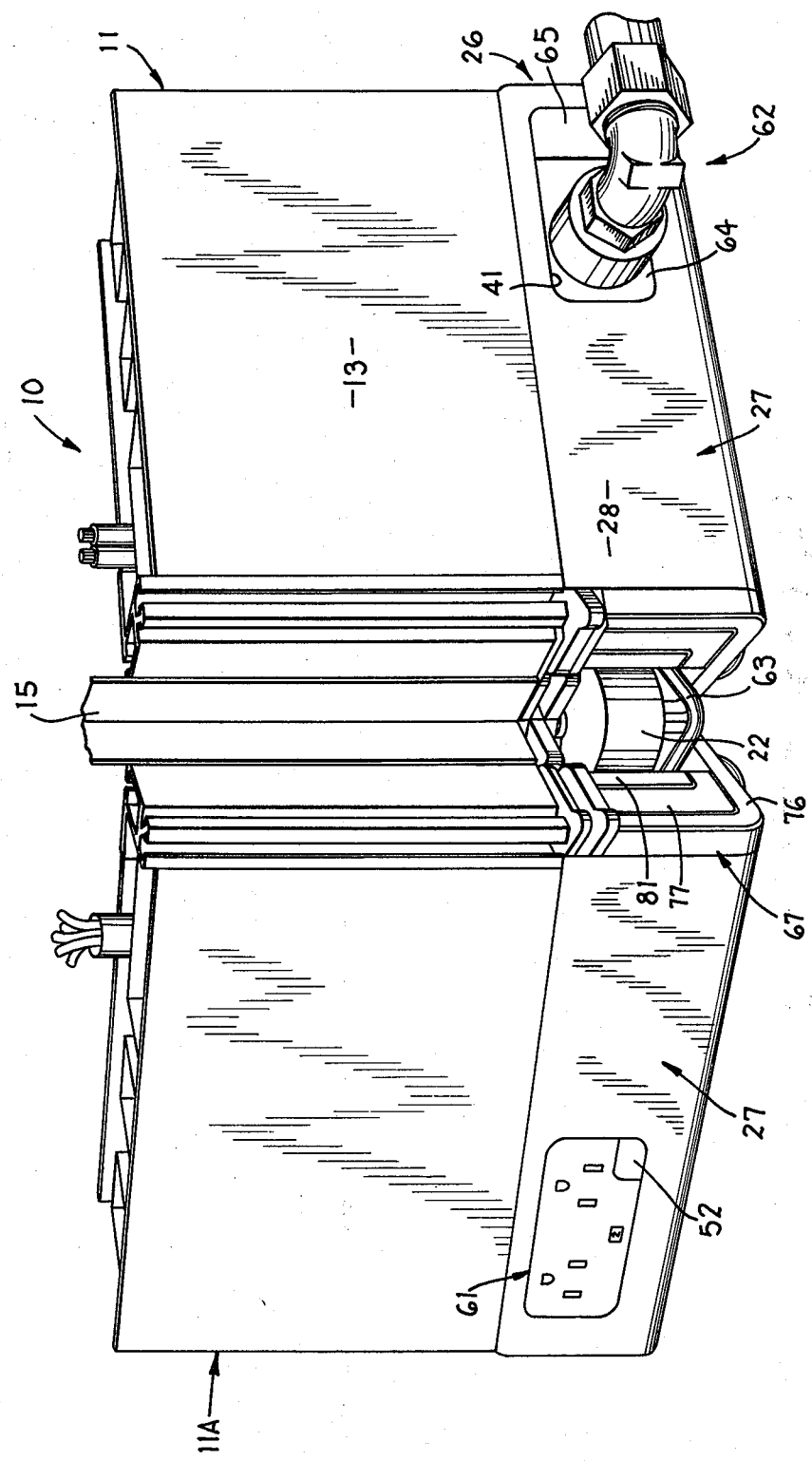

RACEWAY STRUCTURE FOR POWER PANEL

FIELD OF THE INVENTION

This invention relates to an improved power and communication raceway structure as associated with an electrically-prewired wall panel.

BACKGROUND OF THE INVENTION

Interior wall panel systems of the type used for dividing offices and other interior regions into smaller work areas are well known. These systems include a plurality of prefabricated upright panels releasably joined together and, in recently developed systems, the panels are individually electrically prewired, with electrical terminals on adjacent panels being joined by flexible electrical connectors which plug into the adjacent terminals, whereby the supplying of electrical energy to areas bounded by the panel system is greatly facilitated. The panels have a power and communication raceway structure extending longitudinally along the lower edge thereof, which structure facilitates the extension of both electrical and communication cables along the system in an efficient yet hidden manner, while permitting desired utilization of these cables at selected locations. While the known panel systems of this type are highly desirable and have met with substantial commercial success, nevertheless continued development has been carried out in an attempt to improve upon the usability, flexibility, dependability, appearance and convenience of such systems, including the improvement of system components, such as the power and communication raceway structure as integrally associated with each panel.

Accordingly, the present invention relates to an improved raceway structure for association with a wall panel so as to enclose and confine power and communication cables which extend longitudinally along the wall panel and longitudinally throughout several series-connected such panels. More specifically, this invention provides an improved raceway structure which utilizes a pair of removable side covers which removably attach to the wall panel and cooperate to define a raceway for enclosing therein the electrical terminals and communication cables, which raceway structure also has access openings for providing convenient access to the electrical terminals, such as by permitting an electrical receptacle, power feed, or communication cable to be positioned therein or passed therethrough. The improved side cover has a closure integrally hinged thereto for closing the access opening when use of same is not desired so that the cover has a smooth and pleasing appearance, with the closure being swingable into an open position within the raceway while remaining integrally attached to the cover when use of the opening is desired, whereby different openings can be selectively utilized when desired and then closed again when use of the opening is not desired.

The present invention also provides an improved end cover associated with the raceway for effectively closing and providing a pleasing appearance on the exposed end of the raceway, which end cover has a two-part openable door which remains integrally but hingedly attached to the end cover, whereby the door can be swung inwardly into the raceway whenever it is desired to have components such as a flexible electrical connector or a communication cable extend between adjacent panels. These end covers, in association with the side covers, in addition to providing the overall wall panel with a pleasing and streamlined appearance, also facilitate the use and flexibility of the panel system by permitting the electrical system and the individual panels to be interchanged and connected in different sequences or arrangements as desired, inasmuch as the various closures and doors can be opened or closed as desired inasmuch as they all remain integrally hinged to the associated raceway structure.

The improved power and communication raceway structure of the present invention is designed specifically for use with the improved electrically-prewired wall panel system disclosed in copending application Ser. No. 044,514, filed June 1, 1979.

SUMMARY OF THE INVENTION

The lower edge of the wall panel has a raceway structure formed by a pair of identical L-shaped side covers which mount onto the panel from the opposite sides thereof. These side covers cooperate to define an elongated channel or passage which extends throughout the lower edge of the panel. This channel confines therein electrical power terminals, and also accommodates therein a large number of communication cables which extend longitudinally along the series-connected panels. Each side cover has a windowlike opening formed in the sidewall thereof in the vicinity of the electrical terminal, and a closure is permanently and integrally hinged to the cover for movement between a position wherein the opening is closed so as to provide the cover with a smooth and streamlined exterior sidewall, and an open position wherein the cover is hinged inwardly and stored within the channel. The closure preferably includes primary and secondary portions which can be individually swingably moved between open and closed positions so as to individually partially uncover or close the opening, depending upon the use therefor. The raceway structure is also closed at each end thereof, adjacent each end edge of the panel, by a pair of cooperating end covers which are fixedly secured to the adjacent ends of the side covers. Each end cover has an end wall provided with a closure hingedly but integrally connected thereto, whereby the closure can be swingably moved from a closed upright position inwardly into an open storage position wherein the closure overlies the bottom of the channel. In this latter position, an opening is formed in the end of the raceway to permit communication cables and/or a flexible electrical connector to extend between adjacent series-connected panels.

BRIEF DESCRIPTION OF THE DRAWINGS

FIG. 2 is a fragmentary side view, on an enlarged scale, illustrating the raceway structure associated with the lower edge of a panel.

FIGS. 3 and 3A are enlarged, fragmentary sectional views taken along lines III—III and IIIA—IIIA, respectively, in FIG. 2.

FIG. 3B is a fragmentary sectional view taken along line IIIB—IIIB in FIG. 3A.

FIG. 4 is an enlarged elevational view showing a portion of the raceway side cover.

FIGS. 5 and 6 are fragmentary sectional views taken along lines V—V and VI—VI, respectively, in FIG. 4.

FIG. 7 is an enlarged fragmentary elevational view showing the attachment of the end cover to the side cover.

FIG. 8 is a view taken along line VIII—VIII in FIG. 7.

FIG. 9 is a view similar to FIG. 8 but with one of the end cover doors swung inwardly into an open position.

FIG. 11 is a fragmentary perspective view illustrating the joined lower corners of adjacent panels positioned in an angular relationship similar to that illustrated in FIG. 10.

Figure 1:
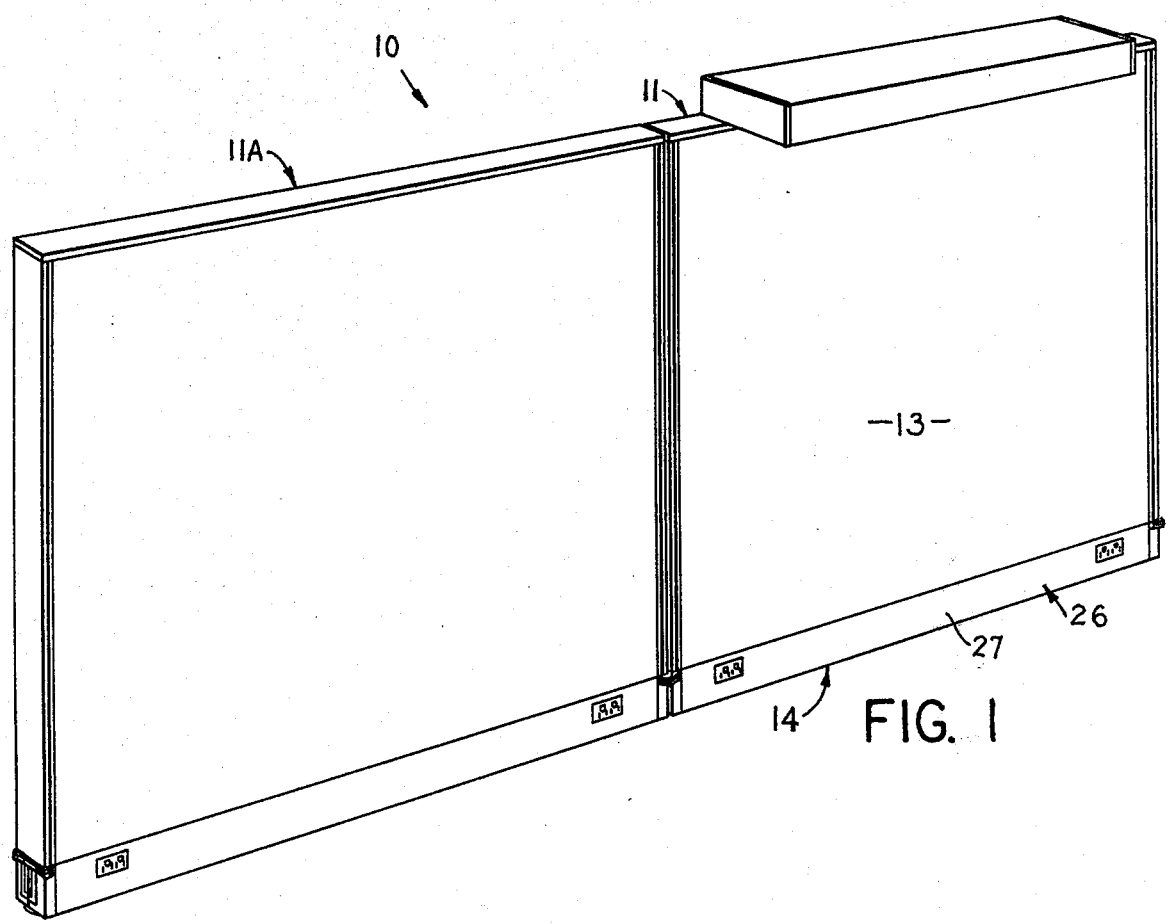
FIG. 1 is a perspective view illustrating a wall panel system incorporating therein the improved raceway structure of the present invention, only two panels being horizontally series-connected for purposes of illustration.

Certain terminology will be used in the following description for convenience in reference only and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the panel and designated components. Said terminology will include the words specifically mentioned, derivatives thereof, and words of similar import.

DETAILED DESCRIPTION

FIGS. 1 and 11 illustrate a wall panel system 10 formed by a series of interconnected upright prefabricated wall panels, only two substantially identical panels 11 and 11A being illustrated. Panels of different lengths can be serially interconnected, as by an L-shaped plastic hinge 15.

Figure 1A:
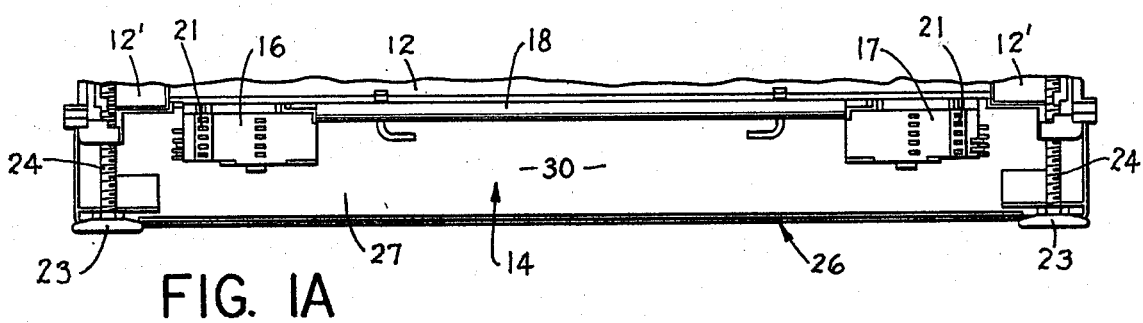
FIG. 1A is an enlarged, fragmentary view illustrating the prewired raceway, with one side cover removed, as associated with the lower edge of the panel.

Each panel, such as panel 11, includes an internal rigid rectangular frame formed by parallel top and bottom rails rigidly joined together by parallel side rails, the bottom rail 12 and side rails 12' being partially illustrated in FIG. 1A. These rails are channel-shaped and open inwardly of the panel, whereby the frame normally confines therein a suitable core structure, such as a honeycomb layer. The core and frame are normally sandwiched between thin facing sheets disposed on opposite sides of the frame, which sheets in turn are normally covered by a suitable fabric, the latter defining the exterior side faces 13 of the panel. The structure of panel 11 and hinge 15 is well known, and one such structure is disclosed in U.S. Pat. No. 4,060,294.

Panel 11 (as well as panel 11A) is provided with a prewired electrical system 14 extending longitudinally along the lower edge thereof, which system includes identical power blocks or terminals 16 and 17 disposed adjacent the opposite lower corners of the panel, as illustrated in FIG. 1A. Power blocks 16 and 17 are electrically joined together by a plurality of electrically conductive wires which extend therebetween and are disposed within the elongated closed channel 18, the latter being fixedly but releasably connected to the underside of bottom frame rail 12.

To transmit electrical energy between adjacent connected panels to thereby define one or more electrical circuits extending longitudinally along the wall system, the opposed power blocks of adjacent panels are electrically but releasably joined together by means of a flexible, specifically a hinged, electrical connector 22 (FIG. 10) which creates a plug-in electrical connection with each of the power blocks. For this purpose, each power block has a pair of plug-like connector portions 21 associated therewith and located on opposite sides thereof, whereby each power block can have two such connectors 22 joined thereto adjacent the opposite sides thereof.

Each panel is further provided with a pair of support feet or glides 23 adjacent the opposite ends thereof, which glides have upwardly projecting threaded shafts 24 integrally associated therewith for adjustably but fixedly joining the glides to the interior frame structure of the panel in a conventional manner.

The wall system as briefly described above, including the individual panels and the electrical system associated therewith, is disclosed and described in greater detail in the aforesaid patent and copending applications.

To enclose the electrical system and any communication cables which are to be strung along the wall system, each wall panel is provided with a raceway 26 along the horizontally extending lower edge thereof. This raceway is formed by a pair of identical, elongated L-shaped side covers 27 (FIG. 3) which cooperate with one another and with the bottom rail 12 to define a closed channel or passage 30 which extends longitudinally along the lower panel edge. The channel 30 has the power blocks 16 and 17 located therein and also surrounds the wire-confining channel 22, although passage 30 is isolated therefrom to enable communication cables or the like to be fed therethrough.

The side cover 27, as illustrated by FIGS. 2–6, includes a substantially vertical side leg 28 which is disposed substantially flush with the side surface of the panel, and at its lower end is fixedly, here integrally, joined to a substantially horizontally extending bottom leg 29 which defines the bottom wall of channel 30. The side cover 27 is preferably formed of a relatively rigid yet slightly flexible plastic material to facilitate the attachment or removal of the cover with respect to the panel.

The side cover has an inwardly projecting mounting flange 31 integrally formed thereon adjacent the upper end of the side leg 28, which flange extends inwardly in substantially parallel relationship to the bottom leg 29 and is adapted to be disposed within a narrow slot formed above a rigid stationary ledge 32 which projects sidewardly from the wire-confining channel 22. The mounting flange 31 has an enlargement or projection 33 to facilitate the releasable securement of the flange 31 within the slot.

Each bottom leg 29 has, adjacent the intersection thereof with the side leg, an L-shaped support lip 34 projecting downwardly from the bottom side thereof. One of these lips 34 supportingly receives therein the free edge associated with the bottom leg 29 of the other side cover 27, when the two covers are mounted on the panel as illustrated in FIG. 3, to prevent downward sagging or separation of the overlapped bottom legs 29 due to loading imposed thereon, such as by communication cables and the like disposed within the channel 30.

The overlapped bottom legs 29 also have an interlock structure 36 associated therewith to prevent sideward spreading or separation of the side covers. This interlock structure 36 (FIGS. 3A and 5B) is formed by identical V-shaped tabs 37 formed on each of the bottom legs 29, which tabs overlie one another and can be forcibly displaced upwardly so as to interfere with one another as illustrated in FIG. 3B, thereby preventing the overlapped legs 29 from sidewardly separating. Each said tab 37 is integral with the bottom leg and is formed between a pair of parallel longitudinally extending cuts 38, with the tab being defined between these cuts by suitable bend or hinge lines 39. The tabs 37 can be easily manually displaced upwardly into an interlock position, as illustrated in FIG. 3B, by pushing the tabs upwardly from the bottom side of the raceway. The interlocking tabs do not interfere with removal of the side covers, however, inasmuch as the side covers can be individually removed by pulling the top edge of the side leg 28 outwardly to remove the mounting flange 31 from the slot, whereupon the cover can then be hinged outwardly and downwardly to disengage the tabs 37.

To provide convenient access to the interior of raceway 26, each side cover 27 has a substantially rectangular windowlike opening 41 formed therein in close proximity to each power block, the illustrated embodiment thus having two such openings therein located adjacent the opposite ends of the side leg 28. Each opening 41 has a closure structure 42 associated therewith for permitting the opening to be suitably opened or closed as desired.

The closure structure 42 includes a mounting plate 43 which is positioned directly below the opening 41 and is fixedly secured, as by an adhesive or by bonding, to the inner wall of the side leg 28. A primary closure 44 is provided for closing a majority of the opening 41, this closure 44 having an offset mounting arm 46 integrally provided thereon adjacent the lower edge thereof, this latter arm 46 in turn being integrally joined to the mounting plate 43 by a molded plastic hinge 47. This hinge 47 enables the primary closure 44 to be swingably moved from a closed position wherein the closure substantially occupies the opening 41 so as to be substantially flush with the exterior front face of the side cover, as shown by solid lines in FIG. 5, and an open position wherein the closure 44 is stored within the raceway channel 30 adjacent the bottom thereof, as indicated by dotted lines in FIG. 5.

The primary closure 44 has a small rectangular cutout or notch 48 formed adjacent one of the lower corners thereof, for a purpose explained hereinafter. The upper edge of primary closure 44 has a pair of rearwardly and upwardly projecting locking tabs 49 formed integrally thereon, which tabs are adapted to resiliently snap into a detent-like recess 51 formed adjacent the upper end of the side cover leg 28 directly beneath the mounting flange 31, as illustrated in FIG. 5, so as to releasably but securely maintain the primary closure 44 in its closed position.

The closure structure 42 also includes a secondary closure 52 which is of substantially rectangular configuration but is much smaller than the primary closure 44, said secondary closure 52 being sized so as to substantially occupy or close the cutout 48 associated with the primary closure. This secondary closure 52 is also provided with an integral mounting arm 53 fixed thereto and offset rearwardly from the lower edge thereof, and this latter mounting arm is also integrally joined to the mounting plate 43 by a molded plastic hinge 54. This hinge arrangement enables the secondary closure 52 to be swingably displaced, independently of the primary closure 44, between a closed position wherein it is within opening 41 substantially flush with the exterior side surface of the side cover leg 28 (as shown by solid lines in FIG. 6) and an open position wherein the secondary closure 52 is stored within the raceway channel 30 adjacent the bottom thereof (as indicated by dotted lines in FIG. 6).

To securely but releasably maintain the secondary closure 52 in the closed position, the mounting plate 43 has a resilient locking finger 56 associated therewith, the free end of which projects behind so as to slightly overlap the secondary closure 52 as illustrated in FIG. 4, thereby releasably holding the secondary closure in its closed position. The resiliency of finger 56, however, enables it to deflect inwardly so that the closure 52 can be swingably moved therepast into its open position.

The windowlike opening 44 provided in the side cover in association with each power block enables various electrical or communication devices or cables to be disposed for access externally of the panel while being in connection or communication with the interior of the raceway 26. For example, the opening 41 permits a suitable power tap, such as a receptacle unit 61 (FIGS. 2 and 11), to be releasably joined to the power block, as by means of a plug-in connection. This receptacle unit 61, as illustrated in FIGS. 2 and 3, comprises a blocklike member which plugs into the adjacent power block 16 so that the front face of the receptacle unit 61 is thus substantially flush with the exterior sidewall of the side leg 28. The receptacle unit 61 has a small notch or cutout in the lower corner thereof, whereupon the receptacle unit thus has a configuration corresponding to that of the primary closure 44, so that only the closure 44 need be swung into its opened position when it is desired to plug a receptacle unit 61 into the power block.

With respect to the secondary closure 52, it can be moved into its open position either jointly with or independently of the primary closure 44. This secondary closure 52, when opened, provides a small opening as defined by the cutout 48 formed in the primary closure 44 (or an equivalent cutout formed in the receptacle 61), whereby a communication cable 63 (FIG. 2) or the like can be fed outwardly from the raceway channel 30 to a position disposed exteriorly of the wall panel, which communication cable 63 may be for attachment to a telephone, Telex, word processor or the like.

As illustrated in FIG. 11, the opening 41 can also be utilized to permit a blocklike power-feed 62 to be plugged into the power block. This power-feed 62, which has a configuration similar to the opening 41 in that it requires that the primary and secondary closures 44 and 52 both be opened, permits electrical power to be supplied from an external power source, such as a floor-mounted power terminal, to one of the power blocks so as to electrify the system which extends along the wall structure.

The power-feed 62, normally referred to as a base feed unit, plugs into the power block and has a main cover plate 64 which occupies a majority of the opening 41 and is substantially flush with the exterior side surface of the cover 27. A supplemental cover plate 65 is hinged to a vertical edge of main cover plate 64 so as to occupy the remainder of opening 41. This supplemental cover plate 65, which extends the full height of opening 41, can be swung inwardly into an open position, thereby forming a secondary opening whereby a large number of communication cables or the like can be fed from a stationary terminal into the interior of the raceway channel 30.

To close the ends of the raceway, there is provided an end cover 67 (FIGS. 7-10) fixed to each end of each side cover 27, which end cover 67 projects inwardly so as to close one-half the width of the channel 30, whereby when the two opposed side covers 27 are mounted on the panel, the end covers associated therewith cooperate to effectively fully close the end of the raceway channel.

Figure 10:
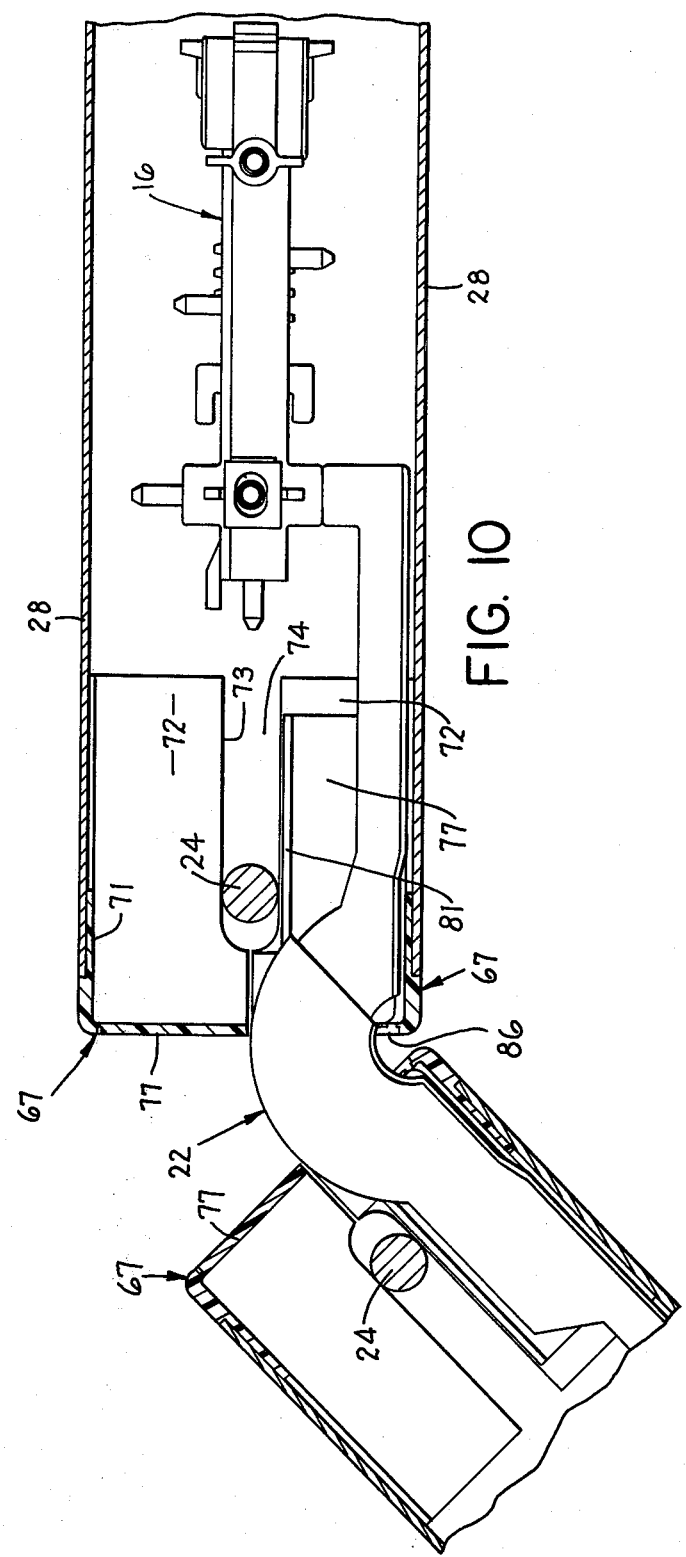
FIG. 10 is a fragmentary sectional view as taken through the raceway structures, as viewed from above, and showing the manner in which adjacent panels are electrically joined together by a flexible electrical connector.

The end cover 67, as illustrated in FIGS. 7-11, includes a sidewall 71 which has a shallow recess over a portion of the front face thereof so as to permit a partial overlap between the sidewall 71 and the side cover leg 28 (FIG. 10), this overlap region permitting the sidewall 71 to be adhesively secured or bonded to the side cover. The sidewall 71 terminates in an integral inwardly projecting bottom wall 72 which extends inwardly a short distance into the bottom of the raceway. This bottom wall 72 projects over approximately one-half the width of the channel but, as illustrated in FIG. 10, has a relief groove 73 formed therein over a portion of the length thereof. This relief groove 73, when the two bottom walls 72 are positioned adjacent one another, results in the formation of an elongated slot 74 (FIG. 10) for providing clearance for the threaded glide shaft 24.

The end cover 67 also has an integral end wall 76 which extends substantially perpendicularly relative to the side cover, which end wall has a movable door or closure 77 associated therewith over a major extent of the area thereof. This closure 77 has the lower edge thereof integrally connected to the rigid end wall 76 by means of an elongated molded plastic hinge 78 to permit the closure 77 to be moved from an upright closed position as indicated in FIG. 8, inwardly and downwardly into an open position as illustrated in FIGS. 9 and 10. The closure 77 is initially fixedly connected to the end wall, and for this purpose is provided with a small fracturable web 79 joined between the upper side edge of the closure 77 and the adjacent edge of the end wall.

Closure 77 also has a separate elongated flap 81 associated with the inner vertical edge thereof, which flap 81 has the vertical edge thereof joined to the closure 77 by means of a molded plastic hinge 82. Flap 81 and closure 77 are also initially rigidly joined together, and for this purpose there is provided a small fracturable web 83 joined between the lower edge of the flap 81 and the adjacent edge of the closure 77.

The two closures 77, when in the closed position illustrated in FIG. 8, effectively wholly close off the end of the raceway channel 30. However, either one or both of these closures 77 can be swung inwardly into an open position to thereby provide access into and through the channel 30. To provide such access, the fracturable web 79 is broken, whereupon the closure 77 can be swung inwardly and downwardly into a storage position within the channel wherein the closure 77 thus effectively overlies the bottom of the channel. When swung into this open position, the web 83 associated with the tab 81 is also broken, thereby permitting the tab 81 to swing upwardly about hinge 82 so as to provide effective clearance for the threaded glide shaft 24, as illustrated in FIG. 9. With one of the closures 77 swung into an open position as illustrated by FIGS. 9 and 10, this thus defines an opening 86 for communication with the raceway channel 30, which opening 86 extends effectively throughout the height of the channel but across only approximately one-half the width thereof. In this manner, by opening the opposed closures 77 of adjacent panels as located adjacent only one side of the panels, as indicated in FIGS. 10 and 11, then communication cables 63 and/or a flexible electrical connector 22 can extend between adjacent panels by passing through the openings 86. The other half of the channel can be closed by the other closures 77, as illustrated in FIGS. 10 and 11, so as to partially close off the ends of the raceway channels and thereby significantly improve the overall appearance of the assembled wall structure. However, if necessary or desired, the two closures 77 associated with the end of the panel can both be folded inwardly into an open position, such as if three wall panels meet at a common intersection so as to permit two flexible electrical connectors 22 to be simultaneously joined to a single power block.

Inasmuch as the closure 77 and tab 81 remain integrally hinged to the end cover 67, the closure can again be swung back into its closed position when desired so as to close off the end of the raceway, in the event that the wall system is repositioned in a different arrangement or configuration.

The use and operation of the wall system described above, and specifically the improved raceway structure, is believed self-evident from the above description.

The improved raceway 26, and specifically the improved structure of the removable covers, is highly desirable since all of the movable closures, such as the closures 44, 52 and 77, can be maintained in closed substantially flush positions so that the raceway thus provides a smooth and streamlined appearance, thereby not detracting from the overall aesthetics and appearance of the wall system. At the same time, each of these closures 44, 52 and 77 can be individually swingably moved into the open position as desired, thereby providing convenient access to the raceway channel 30 so as to permit access to the power blocks or the communication cables, thereby permitting electrical power and communications to be easily transmitted between adjacent panels, or to be tapped off for connection to an external work location. With any of the covers in an open position, the remainder of the raceway structure still has a smooth and substantially closed appearance so that the electrical and communication structure within the raceway is effectively hidden from view. Further, all of the movable closures remain integrally hinged to the raceway covers and are permanently stored within the interior of the raceway, thereby preventing loss of these covers, so that whenever the wall system is rearranged or restructured into a different configuration, then all of the closures or any selected ones thereof can again be returned to their closed positions. In addition, each of the identical side covers 27, with the end covers 67 fixedly attached thereto, can be easily and individually removed from or remounted on the respective wall panel so as to provide total access to the channel 30 along the complete side thereby facilitating the positioning of communication cables within the channel and also facilitating access to the power blocks, such as for attachment or removal of the power taps, such as the receptacle units 61. The complete enclosed raceway is thus effectively formed by two identical elongated pieces, each piece comprising a side cover 27 having a pair of end covers 67 fixed to the opposite ends thereof.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an upright space divider panel adapted to be series-connected with similar such panels for forming a space-dividing wall, said panel having raceway means mounted thereon and extending longitudinally along the lower edge thereof for defining therein a longitudinally extending channel, said raceway means being defined by a pair of spaced and substantially parallel side covers disposed adjacent and approximately coextensive with the opposite side surfaces of the panel, at least one of said covers being movable relative to the panel to provide access to said channel from the side thereof, comprising the improvement wherein one of said side covers has a windowlike opening formed therein and extending therethrough for providing access into and out of said channel, a closure for closing said opening, said closure being positionable within and substantially totally occupying said opening and being substantially flush with said side cover when in the closed position, connecting means for permanently connecting said closure to said side cover while permitting movement of said closure into a storage position within the interior of said channel so as to uncover said opening, an end cover disposed adjacent one edge of said panel and extending transversely across the end of said channel for closing same, said end cover having an opening formed therein and extending therethrough for providing access into the adjacent end of said channel, a barrier for closing said last-mentioned opening, and means joining said barrier to said end cover for permanently connecting said barrier to said end cover while enabling said barrier to be movably displaced from a location within said last-mentioned opening for closing same into a storage position disposed within said channel for uncovering said last-mentioned opening.

2. A wall panel according to claim 1, wherein each said side cover is identical and has said end cover fixedly attached thereto adjacent at least one end thereof.

3. A wall panel according to claim 1, wherein said end cover is divided into two similar portions disposed side-by-side and each having a said barrier associated therewith, said pair of side covers being identical and each having one of said end cover portions fixedly connected thereto adjacent the opposite ends thereof, whereby the end cover portions are disposed in adjacent side-by-side relationship when the pair of side covers are attached to said panel.

4. A wall panel according to claim 3, wherein said closure includes first and second closure parts each occupying only a portion of said windowlike opening, said first and second closure parts being individually and independently attached to and movable relative to said side cover.

5. A wall panel according to claim 1, wherein said side covers are identical and each includes a substantially vertical side leg having said windowlike opening formed therein and a substantially horizontally extending lower leg fixedly connected to said side leg adjacent the lower end thereof, the lower legs of said pair of side covers being disposed in overlapping relationship when said covers are mounted on said panel, each of said covers being releasably attached to said panel.

6. A wall panel according to claim 5, including interlock means integrally formed on the overlapped lower leg portions and coacting with one another for preventing separation of said overlapped lower legs when said covers are mounted on said panel.

7. A wall panel according to claim 1, wherein said barrier includes first and second parts each occupying only a portion of said last-mentioned opening, said first part being hingedly connected to said end cover so as to be swingable inwardly into said storage position, and said second part being hingedly connected to said first part so as to be swingable into a position wherein it is displaced from the plane of the first part.

8. A wall panel according to claim 1, wherein said end cover is divided into two similar portions disposed side-by-side and positioned so as to extend across said channel, each similar portion of said end cover being associated with the respectively adjacent side cover and having a said barrier associated therewith, said barrier being formed by first and second parts, said first part occupying a majority of the last-mentioned opening and being hingedly mounted along its lower edge so as to be swingable into the interior of said channel when disposed in said storage position, said second part being positioned substantially adjacent the longitudinal centerline of the channel and being hingedly connected along one edge thereof to said first part so as to be swingably displaceable away from the plane of the first part when the latter is in said storage position to provide an appropriate clearance for a panel support foot.

9. In a space-dividing wall structure formed from a plurality of prefabricated upright panels which are serially connected together, said wall structure including a prewired electrical system associated therewith and extending longitudinally therealong, said electrical system including at least one electrical terminal block fixedly mounted on each of an adjacent pair of said panels and electrical connector means extending between the terminal blocks of said adjacent panels for transmitting electrical energy therebetween, and a raceway structure associated with the lower edge of each said panel and extending longitudinally thereof, said raceway structure defining therein an interior channel extending longitudinally of the panel, said raceway structure being defined by a pair of horizontally-elongated side covers disposed adjacent the opposite sides of and removably connected to the panel and defining said channel therebetween, said terminal block being disposed within said channel between said pair of removable covers, the improvement comprising a windowlike opening formed in and through said side cover in close proximity to said terminal block for providing access to the latter, and closure means hingedly connected to said side cover and swingably movable between (1) a closed position wherein the closure means is disposed within and totally occupies said opening so as to be substantially flush with said side cover and (2) an open position wherein the closure means is swung inwardly into the interior of said channel for storage therein, said closure means including first and second closures each independently hingedly connected to said side cover and independently swingable between said open and closed positions, said first and second closures when both in said closed position totally occupying and closing said opening, each of said first and second closures being independently swingable into said open position so as to partially uncover said opening.

10. A wall structure according to claim 9, including resilient catch means independently coacting with each of said first and second closures when in said closed position for securely holding said closures in said closed position.

11. A wall structure according to claim 9, wherein said closure means includes a mounting plate fixedly secured to the inner surface of the side cover in close proximity to said opening, each said closure being hingedly connected to said mounting plate by means of an integral hinge therebetween.

12. A wall structure according to claim 9, wherein said windowlike opening is of a substantially rectangular configuration, and wherein said first closure occupies a majority of said windowlike opening and permits a suitable power tap to be positioned within said opening for engagement with said terminal block when said first closure is in its open position, said second closure being disposed adjacent one corner of said windowlike opening and occupying only a minority of the area thereof for permitting a cable to project outwardly from the channel through this region of the opening when said second closure is in its open position.

13. A wall structure according to claim 12, wherein each of said first and second closures are hingedly connected to the respective side cover by individual hinge structures which are positioned adjacent the inner side surface of the respective side cover and are spaced downwardly from the lower edge of the windowlike opening to permit the first and second closures to be swung inwardly into the respective open positions so that the closures are stored in the lower portion of the channel.

14. In a space-dividing wall structure formed from a plurality of prefabricated upright panels which are serially connected together, said wall structure including a prewired electrical system associated therewith and extending longitudinally therealong, said electrical system including at least one electrical terminal block fixedly mounted on each of an adjacent pair of said panels and electrical connector means extending between the terminal blocks of said adjacent panels for transmitting electrical energy therebetween, and a raceway structure associated with the lower edge of each said panel and extending longitudinally thereof, said raceway structure defining therein an interior channel extending longitudinally of the panel, said raceway structure being defined by a pair of horizontally-elongated side covers disposed adjacent the opposite sides of and removably connected to the panel and defining said channel therebetween, said terminal block being disposed within said channel between said pair of removable covers, the improvement comprising a windowlike opening formed in and through said side cover in close proximity to said terminal block for providing access to the latter, closure means hingedly connected to said side cover and swingably movable between (1) a closed position wherein the closure means in disposed within and totally occupies said opening so as to be substantially flush with said side cover and (2) an open position wherein the closure means is swung inwardly into the interior of said channel for storage therein, each of the covers of said pair being of a substantially L-shaped cross section and including a vertically extending side leg connected at the lower end thereof to a horizontally extending bottom leg, said bottom legs overlapping one another and cooperating with the spaced side legs for defining said channel therein, and interlock means coacting between said overlapping bottom legs for preventing separation thereof.

15. A wall structure according to claim 14, wherein said interlock means includes first means coacting between said overlapped bottom legs for preventing downward separation of said legs due to loads imposed thereon by communication cables positioned within said channel, and second means coacting between said overlapping horizontal legs for preventing sideward separation of said legs.

16. A wall structure according to claim 15, wherein the side covers of said pair are identical, and wherein said first and second means are formed integrally with said side covers.

17. In a space-dividing wall structure formed from a plurality of prefabricated upright panels which are serially connected together, said wall structure including a prewired electrical system associated therewith and extending longitudinally therealong, said electrical system including at least one electrical terminal block fixedly mounted on each of an adjacent pair of said panels and electrical connector means extending between the terminal blocks of said adjacent panels for transmitting electrical energy therebetween, and a raceway structure associated with the lower edge of each said panel and extending longitudinally thereof, said raceway structure defining therein in interior channel extending longitudinally of the panel, said raceway structure being defined by a pair of horizontally-elongated side covers disposed adjacent the opposite sides of and removably connected to the panel and defining said channel therebetween, said terminal block being disposed within said channel between said pair of removably covers, the improvement comprising a windowlike opening formed in and through said side cover in close proximity to said terminal block for providing access to the latter, closure means hingedly connected to said side cover and swingably movable between (1) a closed position wherein the closure means is disposed within and totally occupies said opening so as to be substantially flush with said side cover and (2) an open position wherein the closure means is swung inwardly into the interior of said channel for storage therein, and an end cover associated with at least one end of said raceway structure and extending transversely thereacross for closing said channel, said end cover including at least one closure member hingedly associated therewith and selectively swingable between a closed position wherein said closure member extends transversely across at least a portion of said channel for closing same and an open position wherein said closure member is folded inwardly into said channel so as to extend approximately in the longitudinal direction thereof.

18. A wall structure according to claim 17, wherein said end cover has at least a portion thereof fixedly attached to one of said side covers, said portion having said swingable closure member associated therewith.

19. A wall structure according to claim 17 or claim 18, wherein said end cover has two identical said closure member associated therewith and each being independently swingable between said open and closed positions, said two closure members being disposed in side-by-side relationship so that one thereof is positioned closely adjacent one side cover and the other thereof is positioned closely adjacent the other side cover.

* * * * *

UNITED STATES PATENT AND TRADEMARK OFFICE
CERTIFICATE OF CORRECTION

PATENT NO. : 4 277 123
DATED : July 7, 1981
INVENTOR(S) : Richard G. Haworth et al It is certified that error appears in the above—identified patent and that said Letters Patent is hereby corrected as shown below:

Column 11, line 58; change "in" to ---is---.

Column 12, lines 34-35; change "removably" to ---removable---.

Column 12, line 61; change "member" to ---members---.

Signed and Sealed this

Twenty-second Day of September 1981

[SEAL]

Attest:

GERALD J. MOSSINGHOFF

Attesting Officer

Commissioner of Patents and Trademarks